United States Patent
Turnhout

[15] 3,706,131
[45] Dec. 19, 1972

[54] METHOD FOR THE FORMATION OF A UNILATERALLY METALLIZED ELECTRET FOIL

[72] Inventor: Jan Van Turnhout, Delft, Netherlands

[73] Assignee: Nederlandse Organisatie Voor Toegepast-Natuurwetenschappelijk, The Hague, Netherlands

[22] Filed: Nov. 9, 1970

[21] Appl. No.: 88,177

[30] Foreign Application Priority Data

Nov. 12, 1969 Netherlands .......................6916997

[52] U.S. Cl..............................29/592, 307/88 ET
[51] Int. Cl.................................................H01s 4/00
[58] Field of Search....29/592; 179/100, 11 B, 111 E; 178/10; 204/165; 307/88 ET; 317/262; 55/DIG. 39

[56] References Cited

UNITED STATES PATENTS

| | | | |
|---|---|---|---|
| 3,316,620 | 5/1967 | Stewart | 29/592 |
| 3,449,093 | 6/1969 | Baxt et al. | 29/195 |
| 3,354,373 | 11/1967 | Fatovic | 320/1 |

*Primary Examiner*—Charles W. Lanham
*Assistant Examiner*—D. M. Heist
*Attorney*—Watson, Cole, Grindle & Watson

[57] ABSTRACT

The method for manufacturing a unilaterally metallized electret foil consists in that a quadruple spiral, composed of a first unilaterally metallized foil, provided with a covering layer applied to its non-metallized side and whose metallized surface fits closely to a covering layer on the non-metallized surface of a second unilaterally metallized foil, is heated while a d.c. charging voltage is applied to its two metal layers after which the quadruple spiral is allowed to cool to room temperature, the voltage between the layers is switched off, the quadruple spiral is unwound, the covering sheets are removed and the electret foils separated for use.

9 Claims, No Drawings

METHOD FOR THE FORMATION OF A UNILATERALLY METALLIZED ELECTRET FOIL

The invention relates to an improvement in the method for manufacturing a unilaterally metallized electret consisting of a foil of a polymeric substance that in a way known in the art is formed into an electret and in which method the formation process is applied to a double spiral composed of a first unilaterally metallized foil whose metallized surface fits closely to the non-metallized surface of a second unilaterally metallized foil. The formation voltage is applied to the two metal layers and the double spiral is unwound for use after the formation, so that the two electret foils can be separated.

Such a method is described in U.S. Pat. application Ser. No. 838,310. This Patent application is mainly concerned with the heteropolar charging of electrets. As described in that application, the heteropolar charge arises from the alignment of permant dipoles and the migration of ions, i.e., by mechanisms occurring within the organic material.

It has been found that apolar polymers, which contain few dipoles or ions, such as polytetrafluoroethylene, polycarbonate, polypropylene and polyfluoroethylenepropylene, only acquire a slight permanent charge, when subjected to the relatively low voltages used during heteropolar formations.

In order to give these dielectrics high charges, it is necessary to charge them homopolarly. A homopolar charge is caused by injection of charges formed on the outside of the dielectric. An external deposition of charge can be effected most conveniently by using such a high field strength during the formation that dielectric breakdown, viz. a creation of ions, takes place in the air inclusions, which are present between the electrodes and the non-metallized sides of the foils in spite of careful winding.

However, due to the application of high field strengths, breakdown through the electret foils (to be charged) will occur more easily, in particular if they have thin or weak spots. As a result the chance of failure of a formation, increases considerably.

It is the object of the improvement to decrease the failure of the formation and the improved results are achieved by the presence of a covering layer placed on the non-metallized surfaces of both electret foils.

To avoid loss of voltage across the covering sheets a material is chosen with a specific resistance of about $10^2$ to $10^8$ times smaller than that of the foils to be charged. The choice of their thickness is governed by the requirement that they must be capable of withstanding the total formation voltage without damage, whereas on the other hand the covering layers must remain thin enough to be wound into a spiral together with the electret foils.

In general, a thickness that is a factor of about two to four times greater than that of the foils will give an adequate performance.

To avoid a voltage drop across the boundary between the covering layer and the evaporated electrodes of the electret foils, the sides of the covering sheets adjacent to these electrodes can be metallized.

As a covering material for polytetrafluoroethylene, polycarbonate and polyfluoroethylenepropylene electret materials one may use, for instance, polyethyleneterephthalate foil or polysulphone foil. For a polypropylene electret material, polyamide foil, polyacetobutyral foil and cellulosetriacetate foil have been found suitable as covering materials.

In order to obtain an optimal homopolar charge the formation field strength has to be chosen high. It is therefore essential to adjust the formation voltage to such a high value that breakdown does not yet occur through the electret foils. The temperature and time cycle may remain the same as for heteropolar charging. Due to the characteristics of the cover material, the total voltage gradually appears, during formation, on the surfaces of the cover material facing the foils. The voltage will distribute itself between the foils and the air inclusions present between the foils and the covering sheets. In this way, by virtue of the smaller dielectric constant and the lower breakdown voltage of the air, the air will breakdown repeatedly, as required for homopolar charging.

Wherever a weak spot in the foils causes breakdown, on account of the high field strength, it will remain confined to that weak spot because of the low surface conduction and volume conduction and be extinguished rapidly, since the supply of charge to the discharge spot takes place too slowly. Therefore, the use of a high formation field strength, which is necessary for optimal homopolar charging will not, in the improved method, lead to an avalanche-like, short-circuiting of the formation voltage or voltage source, as would happen with known methods of homopolar charging utilizing bare metal electrodes, where a much more intensive breakdown would occur, which would enclose the whole electrode surface.

Consequently, according to the improved method, it will be possible to perform the formation more reliably and more easily.

Though the improvement described is very effective, the chance of a breakdown through the foils can be reduced still further by employing instead of air a gas that breaks down more easily. To this end the formation can be carried out, for instance, in an inert gas atmosphere, so that the formation field strength can be lowered and therefore, it becomes less critical. Also the formation field strength can also be reduced considerably by the application of porous instead of non-porous covering layers. This phenomenon can be explained with the aid of the well-known Paschen curve, which shows that the breakdown field strength for air decreases when the air-gap increases. (See R.M. Schaffert, "Electrophotography", Focal Press, London 1966, page 318).

EXAMPLE I

Heteropolar formation:
TEFLON-FEP (Du Pont de Nemours, Wilmington, Delaware, USA), a copolymer of tetrafluoroethylene and hexafluoropropylene, having a thickness of 12.5$\mu$m was heated at a voltage of 150 Volts from ambient temperature to 180° C at a rate of 5°C/min. and then cooled at the same rate. The permanent heteropolar charge after formation amounted to 0.3 nano Coulomb/cm$^2$.

EXAMPLE II

Homopolar formation:

The formation was carried out according to the improved method, using a material as defined in Example I, which was heated and cooled in the same way as in example I at 1500 Volts with an electrode cover of mylar (Du Pont de Nemours, Wilmington, Delaware, USA) consisting of polyethylene terephthalate with a thickness of 50$\mu$m. The permanent homopolar charge after formation was 38 nano Coulomb/cm².

EXAMPLE III

Homopolar formation:
The formation was performed according to the improved method, taking a material as defined in example I heated and cooled by in the same way as in example I at 700 Volts with a porous electrode covering layer of glass cloth (Interglasgewebe Ulm West-Germany type 9150) of 100$\mu$m. The permanent homopolar charge after formation reached 28 nano Coulomb/cm².

I claim:
1. A method for the manufacture of unilaterally metallized homopolar electrets, comprising the steps of:
 forming a first electret foil from a strip of dielectric material having an electrical conductor formed on one surface thereof;
 forming a second electret foil from a strip of dielectric material having an electrical conductor formed on one surface thereof;
 covering the dielectric material of said first and second electret foils with a covering material having a specific resistance in the range of 2 to 10⁸ less than the specific resistance of said dielectric material;
 winding the covered first and second electret foils into a spiral with the electrical conductor of said first electret foil in abutting relationship with the covering material of said second electret foil;
 applying a unidirectional voltage between the electrical conductors of said first and second electret foils;
 heating and subsequently cooling said spirally wound first and second electret foils;
 removing said unidirectional voltage;
 unwinding said first and second electret foils; and
 removing said covering material from said first and second electret foils.

2. The method as in claim 1 wherein said dielectric material is an apolar polymer and said unidirectional voltage is in the range of 700 – 1500 volts.

3. The method as in claim 2 wherein said covering material is porous.

4. The method as in claim 2 wherein the thickness of said covering material is from two to four times the thickness of each of said first and second electret foils.

5. The method as in claim 2 wherein said heating is from an ambient temperature to substantially 180° C. at a rate of substantially 5° C./min. and said cooling is at said rate to said ambient temperature.

6. The method as in claim 2 wherein the sides of said covering material adjacent the electrical conductors of said first and second electret foils each include a layer of conducting material.

7. The method as in claim 2 wherein said dielectric material is a copolymer of tetrafluoroethylene and hexafluoropropylene having a thickness of substantially 12.5$\mu$m, said covering material comprises polyethylene terephthalate having a thickness of substantially 50 $\mu$m, and said unidirectional voltage is substantially 1500 volts.

8. The method as in claim 2 wherein said electrical conductor is glass cloth having a thickness of substantially 100$\mu$m, and said unidirectional voltage is substantially 700 volts.

9. The method as in claim 2 wherein the steps thereof are carried out in an inert gas atmosphere.

* * * * *